United States Patent [19]

Comparetti

[11] Patent Number: 5,070,547
[45] Date of Patent: Dec. 10, 1991

[54] DUAL HANDLE SEMI-FLUSH RETROFIT KIT

[76] Inventor: Joseph Comparetti, 23 Cedar Grove Ave., Lake Ronkonkoma, N.Y. 11779

[21] Appl. No.: 620,355
[22] Filed: Nov. 29, 1990
[51] Int. Cl.⁵ .............................. E03D 1/14
[52] U.S. Cl. .............................. 4/325; 4/415
[58] Field of Search ................... 4/324–327, 4/378, 405, 415, 411–413, 392–397

[56] References Cited

U.S. PATENT DOCUMENTS

| | | | |
|---|---|---|---|
| 2,688,753 | 9/1954 | Limbert | 4/401 |
| 3,026,536 | 3/1962 | Wood | 4/393 |
| 3,325,828 | 6/1967 | Alexander | 4/386 |
| 3,380,077 | 4/1968 | Armstrong | 4/325 |
| 4,032,997 | 7/1977 | Phripp et al. | 4/393 X |
| 4,411,029 | 10/1983 | Huang | 4/324 |
| 4,483,024 | 11/1984 | Troeh | 4/324 |
| 4,504,984 | 3/1985 | Burns | 4/324 |
| 4,530,119 | 7/1985 | Chiu et al. | 4/324 |
| 4,620,331 | 11/1986 | Sagucio | 4/324 X |

*Primary Examiner*—Charles E. Phillips
*Attorney, Agent, or Firm*—Richard L. Miller

[57] ABSTRACT

A dual handle semi-flush retrofit kit is provided and consists of a water releasable reservoir cup the weight of which varies the effective buoyancy of the flapper flush valve, connected between the flapper flush valve and double flush handles on a toilet tank, such that if one handle is operated the toilet tank is fully flushed in the conventional way. If the other handle is operated the toilet tank is only half emptied thereby saving many gallons of water. This dual handle semi-flush retrofit kit can be easily installed by the do-it-yourself home owner.

6 Claims, 1 Drawing Sheet

U.S. Patent  Dec. 10, 1991  5,070,547
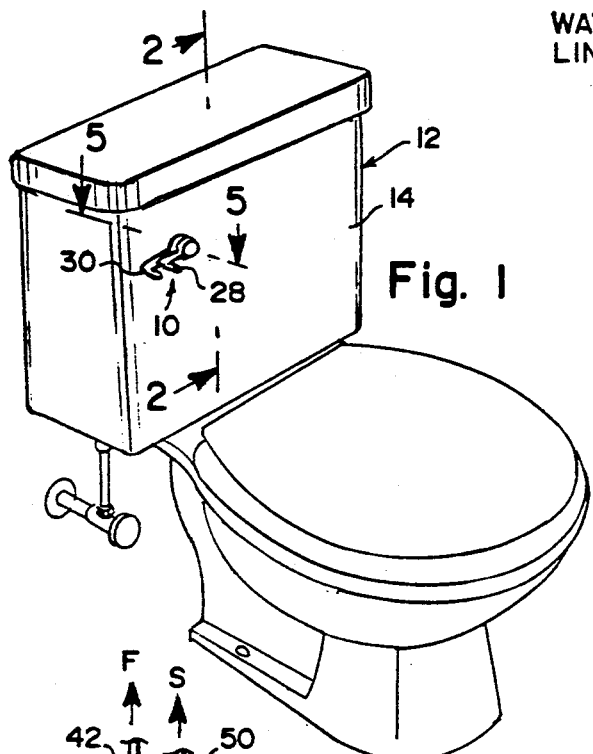
Fig. 1
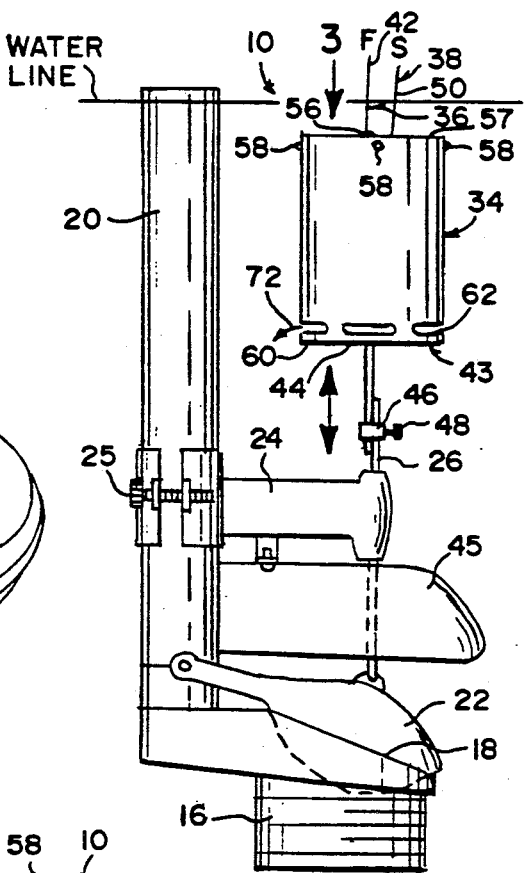
Fig. 2
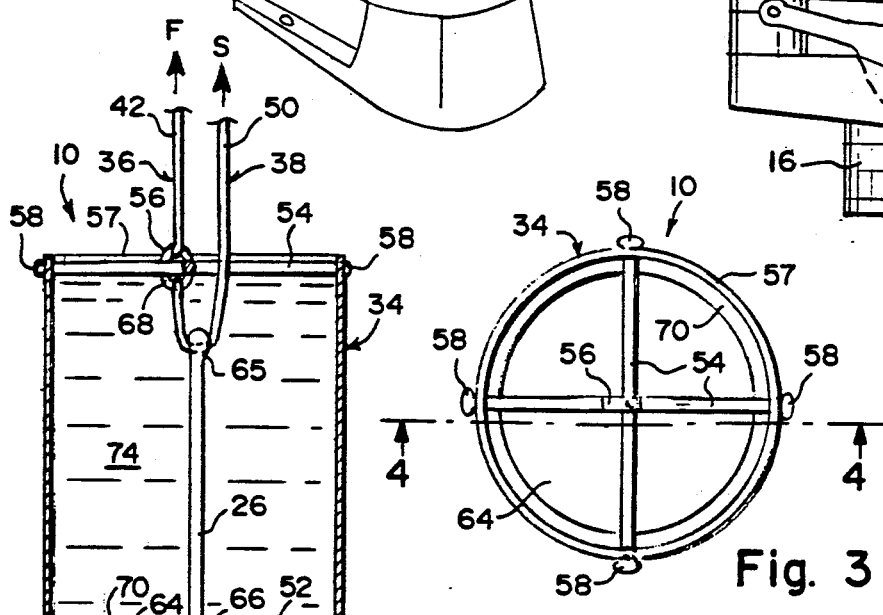
Fig. 3
Fig. 4
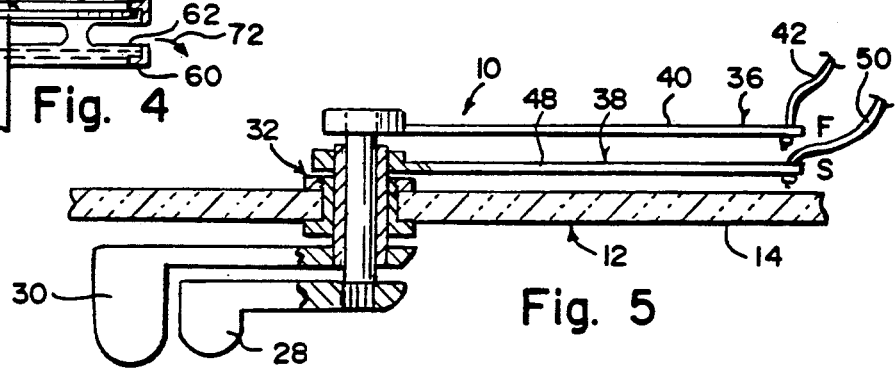
Fig. 5

DUAL HANDLE SEMI-FLUSH RETROFIT KIT

BACKGROUND OF THE INVENTION

The instant invention relates generally to toilet flush valve systems and more specifically it relates to a dual handle semi-flush retrofit kit.

Numerous toilet flush valve systems have been provided in the prior art that are adapted to regulate the volume of water discharged for flushing when evacuating toilet bowls. For example, U.S. Pat. Nos. 3,325,828 to Alexander; 4,483,024 to Troeh; 4,504,984 to Burns and 4,620,331 to Sagueio all are illustrative of such prior art. While these units may be suitable for the particular purpose to which they address, they would not be as suitable for the purpose of the present invention as hereafter described.

SUMMARY OF THE INVENTION

A primary object of the present invention is to provide a dual handle semi-flush retrofit kit that will overcome the shortcomings of the prior art devices.

Another object is to provide a dual handle semi-flush retrofit kit that includes double flush handles, such that if one handle is pressed downward the toilet is flushed fully in the conventional way, and if the other handle is pressed downward, the tank is partially emptied.

An additional object is to provide a dual handle semi-flush retrofit kit that includes a water releasable reservoir cup which can control the amount of water that is flushed into the toilet bowl so as to save many gallons of water over a long period of time.

A further object is to provide a dual handle semi-flush retrofit kit that is simple and easy to use, and can be easily installed by the do-it-yourself home owner.

A still further object is to provide a dual handle semi-flush retrofit kit that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only and that changes may be made in the specific construction illustrated and described within the scope of the appended claims.

BRIEF DESCRIPTION OF THE DRAWING FIGURES

The figures in the drawings are briefly described as follows:

FIG. 1 is a perspective view of a toilet with the instant invention installed thereon;

FIG. 2 is an partial elevational view of just the flush mechanism taken in the direction of line 2—2 in FIG. 1;

FIG. 3 is an enlarged top view of the reservoir cup as indicated by arrow 3 in FIG. 2;

FIG. 4 is a cross sectional view through the reservoir cup taken along line 4—4 in FIG. 3; and FIG. 5 is an enlarged cross sectional view taken along line 5—5 of FIG. 1, with parts broken away showing the double flush handles in greater detail.

DETAILED DESCRIPTION OF THE PREFERRED EMBODIMENTS

Turning now descriptively to the drawings, in which like reference characters denote like elements throughout the several views, the Figures illustrate a dual handle semi-flush retrofit kit 10 for use in a toilet 12 of the type having a tank 14, a flush port 16, a valve seat 18, an overflow tube 20, and a flapper flush valve 22. The kit 10 consists of double flush handles 28 and 30 adapted to be concentrically pivotally mounted at 32 to the toilet tank 14 so that each handle 28 and 30 can independently rotate counter-clockwise on the toilet tank 14.

A reservoir cup 34, for holding water therein, is carried on the lift wire 26. A first mechanism 36 is coupled between the first handle 28 and the reservoir cup 34, for causing a conventional full flush cycle F in the toilet tank 14, when the first handle 28 is manually rotated counter-clockwise on the toilet tank 14 to open and close the flapper flush valve 22 on the valve seat 18. A second mechanism 38 is coupled between the second handle 30 and the reservoir cup 34, for causing a semi-flush cycle S in the toilet tank 14, when the second handle 30 is manually rotated counter-clockwise on the toilet tank 14 to open and close the flapper flush valve 22 sooner on the valve seat 18.

The first mechanism 36 includes a first lift arm 40 coupled to the first handle 28 so that the first lift arm 40 will be lifted in a counter-clockwise direction when the first handle 28 is manually rotated counter-clockwise. A first flexible lanyard 42 is connected between an end of the first lift arm 40 and the reservoir cup 34. A structure 43 in the reservoir cup 34 is for releasing water out of the bottom 44 of the reservoir cup 34 when the first handle 28 is manually rotated counter-clockwise thereby causing the flapper flush valve 22 to close slowly for the conventional full flush cycle F in the toilet tank 14.

A deflector shield 45 is secured to the guide arm 24 between the bottom 44 of the reservoir cup 34 and the top of the flapper flush valve 22 so as to protect the flapper flush valve 22 from the pressure of the water spilling out of the tank through flush port 16. An adjustment clamp 46, having a knurled thumb screw 48 is interposed on the lift wire 26 which is split and overlapped so as to permit adjustment to the height setting of the reservoir cup 34 carried on the lift wire 26.

The second mechanism 38 includes a second lift arm 48 coupled to the second handle 30 so that the second lift arm 48 will be lifted in a counterclockwise direction when the second handle 30 is manually rotated counter-clockwise. A second flexible lanyard 50 is connected between an end of the second lift arm 48 and the reservoir cup 34. Another structure 52 in the reservoir cup 34 is for retaining water within the reservoir cup 34. When the second handle 30 is manually rotated counter-clockwise, this allows the flapper flush valve 22 to close faster for the semi-flush cycle S in the toilet tank 14. This because the weight of water 74 contained within the reservoir cup 34 lowers the total effective buoyancy of the flapper flush valve 22 so that as water drains from the toilet tank the flapper flush valve 22 is caused to seat soon in the semi-flush cycle S due to the additional force from the weight of this water 74 which is not other wise present during a full flush cycle F because it has been allowed to spill from the reservoir cup 34 at the beginning of a full flush cycle F as indicated by arrow 72.

The water releasing structure 43 includes a cross bar structure 54 having a top eyelet 56 that is secured to the open top 57 of the reservoir cup at 58, so that the first flexible lanyard 42 can be connected to the top eyelet 56. The reservoir cup 34 has a first annular inner flange 60 at the bottom thereof and a plurality of portholes 62 above the first annular flange 60. A circular plate 64 is secured at 66 to the upper portion of the lift wire 26 within the reservoir cup 34, so as to sit upon the first annular inner flange 60 to expose the portholes 62 and release the water 74 as indicated by arrow 72 when the first flexible lanyard 42 pulls the top eyelet 56, and lifts only the reservoir cup 34 causing portholes 62 to be thereby opened.

The water retainer structure 52 includes the lift wire 26 having an eye 65 formed on its upper end within the reservoir cup 34. The bottom eyelet 68 is on the cross bar 54 so that the second flexible lanyard 50 can extend through the eye 65 the lift wire 26 and be connected to the bottom eyelet 68. The reservoir cup 34 has a second annular inner flange 70 proximate the bottom 44 thereof above the porthole 62, so that the circular plate 64 can bear against the second annular inner flange 70 to seal the bottom 44 of the reservoir cup 34 and retain the water therein when the second flexible lanyard 50 pulls the bottom eyelet 68.

Naturally when the water 74 is spilled during a full flush cycle F it is replenished when the toilet tank is refilled toward the end of the fill as the water level reaches sufficient height to flow over the open top 57 of the reservoir cup 34.

The guide arm 24 provides the mechanism by which the flapper valve-reservoir cup assembly is affixed to the overflow tube 20. It is placed on the tube and lowered to the point where the flapper valve can be attached. The knurled thumb screw 25 is then turned to lock it in place.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. A dual handle semi-flush retrofit kit for use in a toilet of the type having a tank, with a flush port therein, a valve seat, surrounding said port, a flapper flush valve seated on said valve seat for opening and closing said flush port, a lift wire attached to said valve for opening and closing thereof, said kit comprising:
   a) first and second flush handles adapted to be concentrically pivotally mounted to the toilet tank so that each said handle can independently rotate counter-clockwise on the toilet tank;
   b) a reservoir cup, for holding water therein, said cup being carried on the lift wire, means in said cup for retaining water in said cup and for releasing water therefrom,
   c) a first means, coupled between said first handle and said reservoir cup, for causing a conventional full flush cycle in the toilet tank, when said first handle is manually rotated counter-clockwise on the toilet tank to open the flapper flush valve and cause said means in said cup to release said water therefrom;
   d) a second means, coupled between said second handle and said reservoir cup, for causing a semi-flush cycle in the toilet tank, when said second handle is manually rotated counter-clockwise on the toilet tank to open the flapper flush valve and prevent said water from being released from said reservoir thereby causing said valve to seat prematurely.

2. A dual handle semi-flush retrofit kit as recited in claim 1, wherein said first means includes:
   a) a first lift arm coupled to said first handle so that said first lift arm will be lifted in a counter-clockwise direction when said first handle is manually rotated counter-clockwise;
   b) a first flexible lanyard connected between an end of said first lift arm and said reservoir cup; and
   c) said means in said reservoir cup, will release water out of the bottom of said reservoir cup when said first handle is manually rotated counter-clockwise thereby allowing the flapper flush valve to close later for the conventional full flush cycle in the toilet tank.

3. A dual handle semi-flush retrofit kit as recited in claim: 2, further including:
   a) a deflector shield secured to a guide arm between the bottom of said reservoir cup and the top of the flapper flush valve so as to protect the flapper flush valve from the pressure of the water being flushed through said flush port; and
   b) an adjustment clamp on the lift wire which is split and overlapped so as to permit the adjustment of the height setting of said reservoir cup carried on the lift wire.

4. A dual handle semi-flush retrofit kit as recited in claim 3, wherein said second means includes:
   a) a second lift arm coupled to said second handle so that said second lift arm will be lifted in a counter-clockwise direction when said second handle is manually rotated counter-clockwise;
   b) a second flexible lanyard connected between an end of said second lift arm and said reservoir cup; and
   c) said means in said reservoir cup, will retain water within said reservoir cup when said second handle is manually rotated counter-clockwise thereby causing the flapper flush valve to close sooner for semi-flush cycle in the toilet tank.

5. A dual handle semi-flush retrofit kit as recited in claim 4 wherein said water releasing and retaining means includes;
   a) a cross bar having a top eyelet and secured to the open top of said reservoir cup so that said first flexible lanyard can be connected to said top eyelet;
   b) said reservoir cup having a first annular inner flange at the bottom thereof and a plurality of portholes above said first annular inner flange; and
   c) a circular plate secured to the upper portion of the lift wire within said reservoir cup so as to sit upon said first annular inner flange to expose said portholes and release the water when said first flexible lanyard pulls said top eyelet.

6. A dual handle semi-flush retrofit kit as recited in claim 5, wherein said water retaining and releasing means includes:
   a) the lift wire having an eye formed on its upper end within said reservoir cup;
   b) a bottom eyelet on said cross bar so that said second flexible lanyard can extend through said eye on the lift wire and be connected to said bottom eyelet; and
   c) said reservoir cup having a second annular inner flange proximate the bottom thereof above said portholes, so that said circular plate can bear against said second annular inner flange to seal the bottom of said reservoir cup and retain the water therein when said second flexible lanyard pulls said bottom eyelet.

* * * * *